United States Patent Office 3,404,837
Patented Oct. 8, 1968

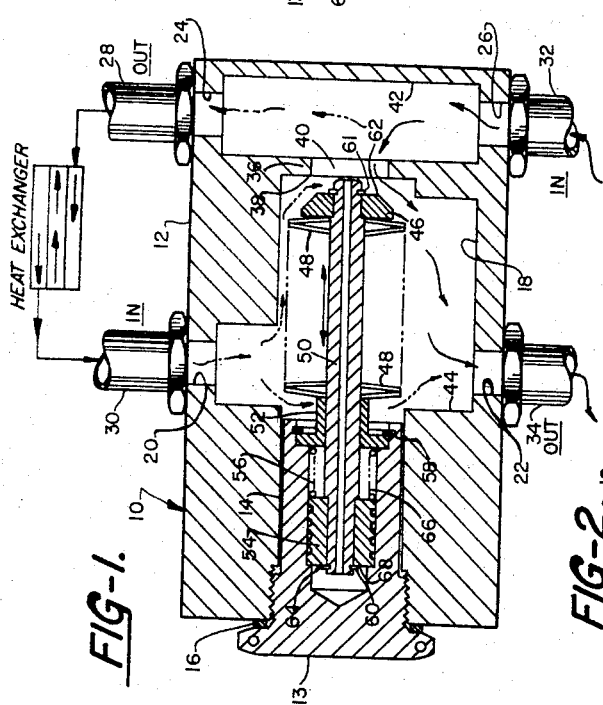

3,404,837
THERMAL BYPASS VALVE WITH
BIMETALLIC CONTROL
Don W. James, Kirtland, Ohio, assignor to North
American Rockwell Corporation
Filed Apr. 24, 1967, Ser. No. 633,236
12 Claims. (Cl. 236—34.5)

ABSTRACT OF THE DISCLOSURE

A fluid bypass valve having a chamber with heat responsive bimetallic discs positioned therein to expand and close off the chamber to incoming fluid above a predetermined temperature level thereby, in the most common uses of the valve, forcing the fluid into a heat exchanger to be cooled. The valve chamber remains closed and continues to divert incoming fluid above a predetermined temperature level to the heat exchanger until the temperature of the incoming fluid drops below the predetermined chamber closing temperature whereupon the heat responsive bimetallic discs contract and open the valve chamber to the incoming fluid thereby bypassing the heat exchanger. The closed valve chamber is also pressure sensitive to open above a predetermined pressure differential level thereby bypassing the heat exchanger.

Background

The present invention refers in general to fluid circuits, such as lubricating systems for speed transmissions in vehicles or airplanes incorporating a heat exchanger, and more specifically to an improved bypass for such systems.

In lubricating systems for high speed transmissions, especially such as used in aircraft, it is known to incorporate a heat exchanger in the system to prevent the lubricating oil from being overheated and thus cause malfunction in the transmission system. At the same time, it is desirable to keep the lubricating oil at a certain minimum temperature for better lubricating characteristics. For this reason, it has been known to incorporate a heat responsive bypass valve in such systems to bypass the fluid circuit to the heat exchanger. This provides a fast heat rise for the lubricating oil which is desirable for proper performance of the transmission system. However, upon reaching a predetermined temperature level, the bypass is automatically closed and the oil is directed through the heat exchanger for cooling. When the temperature of the oil has dropped sufficiently to a predetermined value, the valve again acts to open the bypass and thus allow the oil again to bypass the heat exchanger. In this way, the temperature of the lubricating oil is always kept at a certain desirable level.

The best prior art thermal bypass valve with bimetallic control known to applicant is that disclosed in United States Patent No. 3,300,135 issued Jan. 24, 1967, to G. E. Slater et al.

Summary

In its preferred embodiment the invention provides a novel simple combination thermal and pressure differential bypass valve for use in a vehicle transmission fluid lubricating circuit incorporating a heat exchanger. The bimetallically controlled bypass valve is positioned in the lubricating circuit to direct fluid flow through the heat exchanger when the temperature of the fluid exceeds a predetermined value. The valve also functions to prevent fluid flow through the heat exchanger under a certain fluid differential pressure value.

The present invention represents an improvement over the valve disclosed in United States Patent No. 3,300,135 by providing a simplified valve having only one small poppet valve and one small coil spring. The improved design of the present invention has therefore eliminated one large spring and combines two poppet valves into one poppet valve.

Brief description of drawings

FIGURE 1 is an internal view showing a first embodiment of the invention, the valve being illustrated in position to bypass the heat exchanger or other secondary circuit;

FIGURE 2 is a similar view of a second valve embodiment, the heat exchanger or other secondary circuit not being shown as it is of the same general form as shown in FIGURE 1;

FIGURE 3 is still another valve embodiment showing external as well as internal details;

FIGURE 4 is a similar view of still another valve embodiment showing external as well as internal details.

Preferred embodiments

In FIGURE 1, valve 10 comprises valve housing 12 which is closed at one end by a threaded cap 13, which is integral with valve body 14, sealed by a gasket 16. The valve housing is longitudinally bored to provide a valve chamber 18 which is open to two pairs of oppositely disposed apertures 20, 22, 24 and 26 respectively, which provide connections for the conduits 28 and 30 to the heat exchanger and 32 and 34 to the lubricating circuit (not shown). The valve chamber 18 has an internal flange section 36 which provides a sharp radial edge 38 immediately adjacent a central circular aperture 40. Aperture 40 provides selective fluid communication between the rear part 42 of valve chamber 18 and front part 44 thereof. Valve body 12 is shown as a distinct valve merely for illustration purposes. It may be part of an oil manifold structure, for example.

Annular edge 38 on the internal flange 36 provides a seat for a poppet valve disc 46 which under certain operating conditions is resiliently held in contact therewith by a series of bimetallic discs 48 for a purpose to be described. A hollow plunger rod 50 extends coaxially through valve disc 46 and through valve chamber 18 coaxially through bushing 52 towards the front of the valve and is provided with a peripherally grooved piston 54 which extends into and is axially slidably received in a cylinder 56. Bushing 52 is provided with a radially extending flange abutting a retaining ring 58. Piston 54 and valve disc 46 are retained on opposite ends of plunger rod 50 by retaining rings 60 and 61 respectively. End 62 of valve disc 46 is approximately equal in surface area to end 64 of piston 54 although the area of aperture 40 is greater than the area of piston end 64. A coil spring 66 coiled around plunger rod 50 is positioned between piston 54 and bushing 52 to normally bias piston 54 to the left as viewed in FIGURE 1 against flange seat 68 so that fluid communication exists between rear part 42 and front part 44 of valve chamber 18 through aperture 40.

A series of alternated oppositely facing frusto conical bimetallic discs 48 is interposed between poppet valve 46 and bushing 52 positioned around plunger rod 50 for a purpose to be described. These discs may be composed of a thermostatic bimetal such as for instance, that manufactured by the Chace Company under their specification No. 6650. For the purpose of illustration, this bimetallic material is applicable in a useful deflection temperature range from −100° F. to +400° F. The deflection property of this material is used by assembling a number of such discs in a stack around the hollow plunger stem 50 as shown between poppet valve 46 and bushing 52. As the temperature of the fluid rises, the expanding force of the bimetal discs 48 oppose the force of the small coil spring 66 which normally holds valve disc 46 away from edge 38 on the internal flange 36. At a fluid operating temperature of 183° F. to 187° F., the spring pressure as well as the drag imposed by the piston 54 is completely overcome and the poppet valve disc 46 rapidly closes and seats against edge 38. It will be understood that in other applications bimetals of different composition for different operating temperatures may be employed, and that the above values have been given only for purposes of illustration.

A heat exchanger 70 is conveniently connected by conduit 28 to the output side of thermal valve 10 and the output end of the heat exchanger by conduit 30 to the input end of the valve. It will be understood that any known conventional heat exchanger may be incorporated and this device does not form part of the present invention.

Under normal operating conditions lubricating fluid from a fluid system (not shown) enters the thermal bypass valve 10 through aperture 26 at conduit 32 into the rear part 42 of the valve chamber 18. Fluid normally flows through the valve conduit 32 through aperture 40 around edge 38 past the bimetallic discs 48 and out through the aperture 22 into return conduit 34 because the back pressure or pressure drop through heat exchanger 70 is higher than through valve 10. However, when the temperature of the lubricating fluid rises above a predetermined desirable operating temperature, the thermal valve closes and diverts the fluid through the heat exchanger 70 in a manner presently to be described. Conversely, when the temperture of the oil drops sufficiently, the valve again opens and acts to bypass the heat exchanger circuit.

Thus, when the lubricating fluid becomes too hot for safe operation, the bimetallic discs 48 expand between the valve disc 46 and the bushing 52 thereby compressing spring 66 with the result that piston 54, plunger stem 50, and poppet valve disc 46 are displaced to the right until valve disc 46 comes into seating contact with edge 38, closing aperture 40 and shutting off fluid communication between the rear part 42 and front part 44 of valve chamber 18. The expanding force of the bimetallic discs 48 does not have to completely overcome the hydraulic force on end 62 of valve head 46 because this force is substantially cancelled by the approximately equal opposing force produced on end 64 of piston 54 by fluid communicated to end 64 through the hollow plunger stem 50. The hot lubricating fluid is now forced to flow through the rear valve chamber part 42, out through aperture 24 through conduit 28 into the heat exchanger 70. From there the fluid flows back through conduit 30 into aperture 20 into front valve chamber part 44, past bimetallic discs 48 and out through aperture 22 into return conduit 34.

When the temperature of the lubricating fluid has sufficiently decreased, heat sensitive bimetallic discs 48 which are in constant fluid contact contract again and coil spring 66 expands between bushing 52 and piston 54 with the result that piston 54, plunger stem 50, and valve disc 46 are displaced to the left away from edge 38 to once again open direct communication between rear part 42 and front part 44 of valve chamber 18.

In addition to functioning as a thermal bypass valve, valve 10 also functions to bypass heat exchanger 70 when the fluid pressure exceeds a designed safe pressure when the fluid is flowing through the heat exchanger. That is, assuming again the closed position of disc 46 relative to aperture 40, if a fluid pressure differential exists such as occurs when the five passages in the heat exchanger 70 become plugged, the pressure in chamber 42 builds up sufficiently that the force exerted on the exposed face of disc 46 through aperture 40 overcomes the force of disc 48 and disc 46 is moved to the left with the result that the lubricating fluid is caused to flow through the valve aperture 40 and out aperture 22 to conduit 34 thereby bypassing heat exchanger 70 as described herein above. Thus, pressure acting on disc 46 that exceeds the pressure on side 44 of valve disc 46 and the force of the bimetal discs 48, cooperates with spring 66 to displace valve disc 46 to the left thereby opening aperture 40.

In summary, it will be noted that valve 10 functions in response to unbalanced forces being exerted on the several component parts. Thus, when the summation of the forces acting upon end 62 of disc 46 and piston 54 by spring 66 toward the left exceed the summation of the forces directed toward the right aperture 40 is open and fluid is caused to bypass heat exchanger 70. Conversely, when the summation of the forces exerted by expanding bimetallic discs 48 and the fluid pressure exerted upon end surface 64 of piston 54 directed toward the right exceed the summation of the forces directed toward the left, aperture 40 is closed and fluid is caused to pass through the heat exchanger 70 as hereinabove described.

Where valve 10 is designed so that valve disc 46 seats against edge 38 at a fluid temperature of 183° F. to 187° F. as hereinabove described, fluid above this design temperature for example, of 195° F., will unseat poppet valve disc 46 from aperature 40 at a pressure of 60 p.s.i. to 90 p.s.i. and will flow from rear chamber 42 through aperture 40 into front chamber 44 through aperture 22 out through conduit 34 thereby bypassing heat exchanger 70. Thus, although valve 10 normally functions to direct fluid above a predetermined temperature level through the heat exchanger 70 where that fluid also exceeds a predetermined pressure differential level, valve 10 functions to direct the temperature-pressure elevated fluid through valve chamber 18 thereby bypassing heat exchanger 70.

To minimize the description of the valve embodiments shown in FIGURES 2–4 I have used the same numerals with letter suffixes to designate similar features, for example, valve 10 of FIGURE 1 is designated as valve 10a in FIGURE 2; valve 10b in FIGURE 3; and valve 10c in FIGURE 4. Since the valves shown in FIGURES 2–4 function similarly to the valve shown and described with reference to FIGURE 1 I will describe only the differences between them.

For example, in FIGURE 2 valve body 14a is a slip fit into valve housing 12a and held in place by retaining ring 72. An O-ring 74 inserted into groove 76 of valve body 14a insures a seal between the valve body 14a and housing 12a. The valve shown in FIGURE 2 normally operates to permit lubricating fluid to bypass the heat exchanger provided its temperature is less than 155° F. If the fluid temperature reaches 155° then the bimetallic discs 48a expand and cause valve disc 46a to close aperture 40a whereby the fluid enters the heat exchanger as hereinbefore described. Conversely valve disc 46a is caused to crack open and recede toward the left thereby oepning aperture 40a when lubricating fluid at a temperature of 170°±5° F. is under a differential pressure of 25 p.s.i.±5 p.s.i. Under this condition the fluid once again bypasses the heat exchanger as explained above.

In FIGURE 3 a valve 106 is shown similar to the valve shown and described with reference to FIGURE 1. However in FIGURE 3 piston 54b is press fit on to plunger rod 50b and bushing 52b is press fit into threaded cap 14b. Here, valve 46b, shown as a stamping, is caused to close aperture 40b at a fluid temperature of 129° F. to 131° F. Conversely, poppet valve 46b recedes toward the left as hereinbefore described when fluid under a differential pressure of 50 p.s.i. reaches a temperature of 140° F.

The valve 10c shown in FIGURE 4 is also similar to the valve shown in FIGURE 1. Here, however, valve 10c is designed so that poppet valve disc 46c closes aperture 40c at a fluid temperature of 180° F. Conversely, disc 46c recedes toward the left thereby opening aperture 40c when fluid under a differential pressure of 50 p.s.i. to 60 p.s.i. reaches 190° F. to 200° F. It will be noted that valve disc 46c has an extended flange 80 which increases the surface area of the disc to provide greater movement of said disc under low pressure differential conditions.

The present invention may be embodied in other specific forms without departing from the spirit or essential characteristics thereof. The present embodiments are therefore to be considered in all respects as illustrative only and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. For use in a fluid circuit embodying fluid guide structure defining a pair of distinct fluid paths and a by-pass passage interconnecting said paths and having a valve seat therein, a thermal and pressure responsive valve sub-assembly comprising:
    (a) a valve member;
    (b) means mounting said valve member in one of said paths for movement toward and from seating engagement with said valve seat;
    (c) means resiliently biasing said valve member away from said valve seat;
    (d) thermally responsive means disposed in said one path and connected to said valve member to overcome said biasing means and thereby move it to engage said valve seat when the temperature of fluid in said one path exceeds a predetermined magnitude;
    (e) means responsive to the pressure of the fluid in the other of said paths while said valve member is in engagement with said seat for biasing said valve member into engagement with said seat;
    (f) said pressure responsive means having an effective pressure responsive area less than the area of said valve member which is exposed to the fluid pressure in said other path when said valve member is engaged with said seat whereby, when the fluid pressure in said other path exceeds a predetermined magnitude, said valve member is unseated to relieve the pressure in said other path.

2. The combination defined in claim 1 wherein said fluid guide structure is formed with a through opening in the wall of said one path opposite to and in alignment with said valve seat and wherein said valve sub-assembly further comprises a base member extending through and fixed in fluid tight relation within said through opening, each of the other components of said valve sub-assembly being mounted on and supported by said base member.

3. The combination defined in claim 2 wherein said mounting means comprises a bearing mounted on said base member at the side of said one path opposite said valve seat and a valve stem axially reciprocably mounted in said bearing, extending transversely of said one path and supporting said valve member adjacent said valve seat.

4. The combination defined in claim 3 wherein said pressure responsive means comprises a fluid chamber in said body member enveloping the end of said valve stem remote from said valve member, a piston within said chamber fixed to said valve stem, and a fluid passage extending through said valve stem from said chamber at the side of said piston remote from said valve member to the side of said valve member remote from said piston.

5. The combination defined in claim 4 wherein said thermally responsive means comprises a stack of annular bimetallic discs interposed in surrounding relation to said valve stem between said bearing and said valve member.

6. The combination defined in claim 2 wherein said base member is threadedly engaged with said through opening and has an enlarged head of non-circular cross section.

7. The combination defined in claim 6 wherein a gasket is interposed between said body member head and said fluid guide structure.

8. The combination defined in claim 2 wherein said base member is slidably received in said through opening, retained therein by a snap ring and sealed relative thereto by an O-ring.

9. The combination defined in claim 1 wherein said valve member is a thin walled generally frusto conical shell.

10. The combination defined in claim 1 wherein said valve member has an end face having a central flat portion normal to the axis thereof, a frusto conical intermediate portion and a flat peripheral portion parallel to said central portion.

11. A bypass valve for a fluid system having a primary and secondary fluid circuit comprising:
    (a) a valve housing open at one end and divided by an inwardly extending annular flange into first and second chamber portions, said first and second chamber portions being in open communication with said primary and secondary circuits, said second chamber portion containing the open end of said valve housing;
    (b) a cover adapted to close said open end of said valve housing and having an inwardly facing recess;
    (c) a guide piston slidably mounted in said recesss and having a hollow piston rod;
    (d) a piston rod guide bushing fixedly mounted at the open end of said inwardly facing recess;
    (e) a valve head mounted on said piston rod and adapted to sealingly engage said inwardly extending annular flange thereby interrupting fluid communication between said first and second chamber portions;
    (f) a temperature responsive actuating means surrounding said piston rod and positioned between said bushing and said valve head;
    (g) a coil spring compressed between said bushing and said piston, whereby in response to the temperature of said fluid reaching a predetermined level said temperature responsive actuating means moves said valve head into sealing engagement with said inwardly extending annular flange, and in response to reduction in temperature or increase in differential pressure above a predetermined level said coil spring urges said piston away from said bushing thereby releasing said valve head from sealing engagement with said inwardly extending annular flange to its original position.

12. The bypass valve of claim 11 in which said temperature responsive actuating means is a series of bimetallic discs.

No references cited.

EDWARD J. MICHAEL, *Primary Examiner.*